United States Patent
Angst et al.

(10) Patent No.: US 9,246,802 B2
(45) Date of Patent: *Jan. 26, 2016

(54) MANAGEMENT OF ROUTING TABLES SHARED BY LOGICAL SWITCH PARTITIONS IN A DISTRIBUTED NETWORK SWITCH

(71) Applicant: LENOVO ENTERPRISE SOLUTIONS (SINGAPORE) PTE. LTD., Singapore (SG)

(72) Inventors: Debra L. Angst, Rochester, MN (US); Claude Basso, Nice (FR); Josep Cors, Rochester, MN (US); Mark Q. Llacuna, San Jose, CA (US); David A. Shedivy, Rochester, MN (US); Colin B. Verrilli, Apex, NC (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 215 days.

This patent is subject to a terminal disclaimer.

(21) Appl. No.: 13/739,940

(22) Filed: Jan. 11, 2013

(65) Prior Publication Data

US 2014/0146824 A1 May 29, 2014

Related U.S. Application Data

(63) Continuation of application No. 13/688,532, filed on Nov. 29, 2012.

(51) Int. Cl.
*H04L 12/741* (2013.01)
*H04M 7/12* (2006.01)
*H04L 12/46* (2006.01)
*H04L 12/743* (2013.01)
*H04L 12/755* (2013.01)

(52) U.S. Cl.
CPC ............ *H04L 45/54* (2013.01); *H04L 12/4675* (2013.01); *H04M 7/128* (2013.01); *H04L 45/021* (2013.01); *H04L 45/7453* (2013.01)

(58) Field of Classification Search
None
See application file for complete search history.

(56) References Cited

U.S. PATENT DOCUMENTS

| | | | |
|---|---|---|---|
| 6,980,547 B1 | 12/2005 | Gally et al. | |
| 7,733,880 B2 | 6/2010 | Sankaran et al. | |
| 7,895,345 B2 | 2/2011 | Manion et al. | |
| 2003/0231587 A1 | 12/2003 | Sankaran et al. | |
| 2004/0160954 A1 | 8/2004 | Shimizu et al. | |
| 2006/0023724 A1* | 2/2006 | Na et al. | 370/395.53 |
| 2008/0175257 A1 | 7/2008 | Winter et al. | |
| 2008/0240106 A1* | 10/2008 | Schlenk | 370/392 |
| 2010/0135307 A1 | 6/2010 | Nakagawa | |
| 2011/0142053 A1 | 6/2011 | Van Der Merwe et al. | |
| 2011/0188503 A1 | 8/2011 | Hewson | |
| 2011/0264610 A1* | 10/2011 | Armstrong et al. | 706/12 |
| 2011/0271102 A1 | 11/2011 | Smith | |
| 2012/0054367 A1 | 3/2012 | Ramakrishnan et al. | |
| 2012/0307640 A1 | 12/2012 | Wackerly et al. | |

(Continued)

*Primary Examiner* — Zewdu A Beyen
(74) *Attorney, Agent, or Firm* — Patterson & Sheridan, LLP

(57) ABSTRACT

Techniques are provided for managing a routing table in a distributed network switch. The distributed network switch is divided into logical switch partitions, or logical networks, that may share a routing table. The shared routing table is configured with counters and thresholds to control utilization of the routing table on a per-logical network basis. When counters exceed certain threshold, the routing table is modified to reduce routing entries within the routing table or pause insertion of new routing entries.

13 Claims, 6 Drawing Sheets

(56) References Cited

U.S. PATENT DOCUMENTS

| | | |
|---|---|---|
| 2013/0054763 A1 | 2/2013 | Van der Merwe et al. |
| 2013/0290468 A1 | 10/2013 | Ramakrishnan et al. |
| 2014/0016476 A1 | 1/2014 | Dietz et al. |
| 2014/0016644 A1 | 1/2014 | Vasseur et al. |
| 2014/0146824 A1 | 5/2014 | Angst et al. |

* cited by examiner

MANAGEMENT OF ROUTING TABLES SHARED BY LOGICAL SWITCH PARTITIONS IN A DISTRIBUTED NETWORK SWITCH

CROSS-REFERENCE TO RELATED APPLICATIONS

This application is a continuation of co-pending U.S. patent application Ser. No. 13/688,532, filed Nov. 29, 2012. The aforementioned related patent application is herein incorporated by reference in its entirety.

BACKGROUND

Embodiments of the invention generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the invention provide a method, product, and system for performing an operation for routing table management in a distributed network switch having a plurality of switch modules, wherein the switch modules includes at least a first switch module. The switch modules include a plurality of bridge elements and a routing table. The routing table in each switch module is shared among the plurality of bridge elements in the respective switch module. The plurality of switch modules is logically partitioned into a plurality of logical networks. The operation includes receiving, by the first switch module, a first frame having a source address and a destination address. The first frame is associated with a first logical network of the plurality of logical networks. The operation further includes, upon determining that the routing table of the first switch module does not include a routing entry for the source address, modifying the routing table in the first switch module to include a first routing entry having routing information determined for the source address and the first logical network. The operation includes updating a count of routing entries in the routing table that are associated with the first logical network. The operation further includes, upon determining that the count of routing entries associated with the first logical network exceeds a first threshold value associated with the first logical network, modifying the routing table to invalidate a second routing entry in the routing table based on the second routing entry being associated with the first logical network.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

Figure 1:
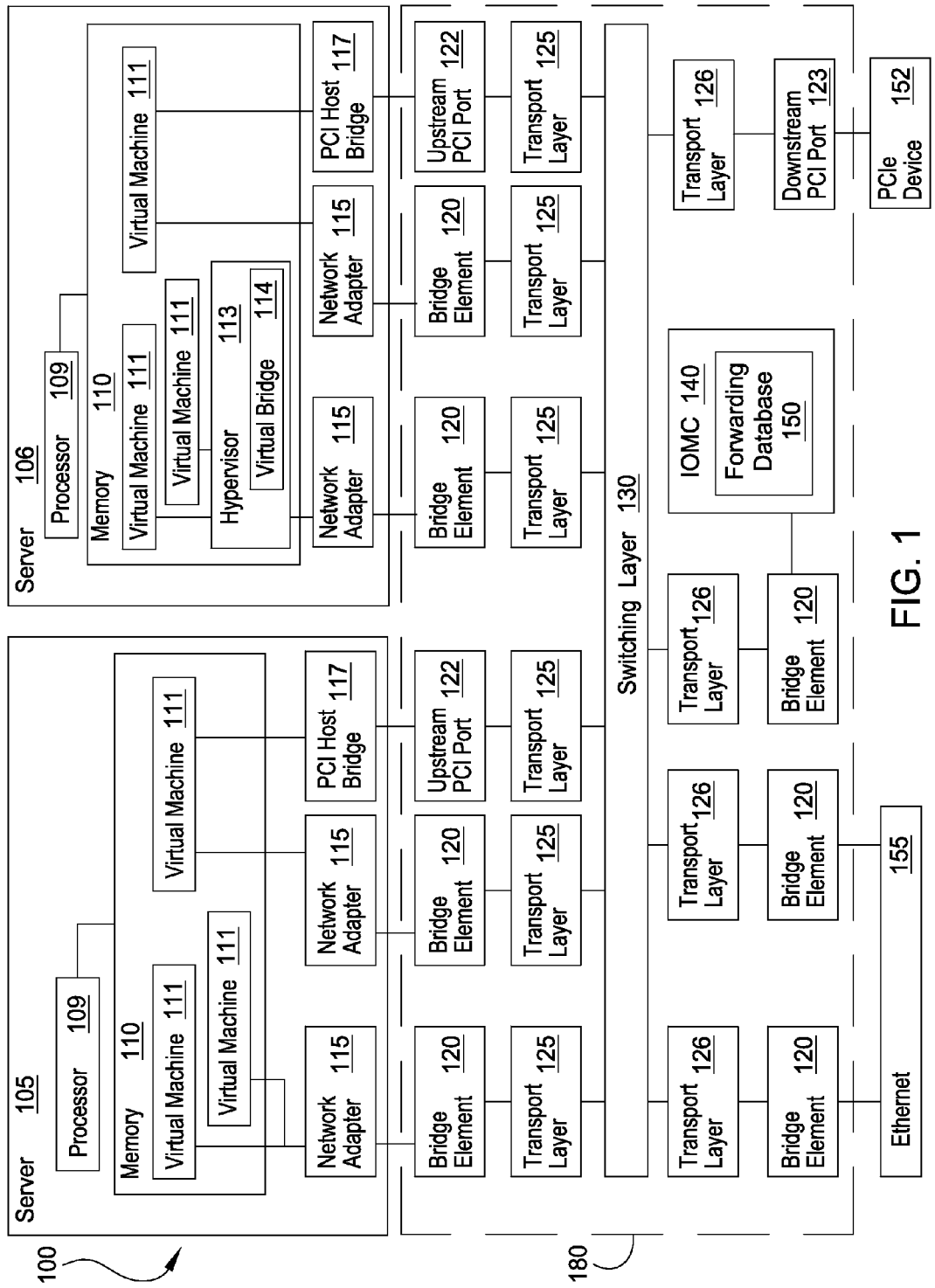
FIG. 1 illustrates a system architecture that includes a distributed network switch, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present disclosure provide techniques for managing a shared routing table in a distributed network switch. In one embodiment, the distributed network switch may be divided into logical switch partitions, or logical networks (LNs), that share a common forwarding database (FDB). An end station on a given LN with a larger number of MAC addresses may dominate the shared FDB and fill the routing table, thereby cause other end stations on other LNs to flood the network with requests. In one embodiment of the invention, the distributed network switch maintains a plurality of counters for entries in the shared FDB to control the usage of the shared FDB per logical network. According to one embodiment, the distributed network switch may dynamically set threshold values for the counters. In one example, when a counter for a given LN reaches a threshold level, the distributed network switch may select and invalidate existing routing entries from the shared FDB for the given LN according to various criteria. In another example, when a counter for a given LN reaches a threshold level, the distributed network switch may limit learning of new network addresses for the given LN in the shared FDB.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

For example, while the certain aspects of the present disclosure may discuss a forwarding database for finding an outgoing interface to forward a data frame received on an input interface, it should be recognized that the techniques and embodiments described herein may be extended to other packet switching systems, such as routing tables, routing information bases (RIBs), routing databases, etc. As such, the terms "forwarding" and "routing" may be used interchangeably herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture 100 that includes a distributed network switch 180, according to one embodiment of the invention. The computer system 100 includes a first and second server 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that is coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

In one embodiment, the IOMC 140 may include a global forwarding database (FDB) 150, also referred to as a forwarding information base (FIB) or forwarding table, that stores address data. The forwarding database 150 may be shared by a plurality of bridge elements 120. In one embodiment, the forwarding database 150 may be continuously updated by the bridge elements 120. For example, a bridge element may send an update message to the IOMC 140 in response to learning an updated or new MAC address. A corresponding MAC address in the forwarding database 150 may be subsequently updated. Conversely, the address data in the forwarding database 150 may be used to update the bridge elements 120. For example, each bridge element 120 is configured to send a routing information lookup request to the forwarding database 150, and the forwarding database 150 is configured to send a routing information lookup response having address data to the requesting bridge element 120. In one embodiment, each bridge element 120 may cache received address data for future use.

Figure 2:
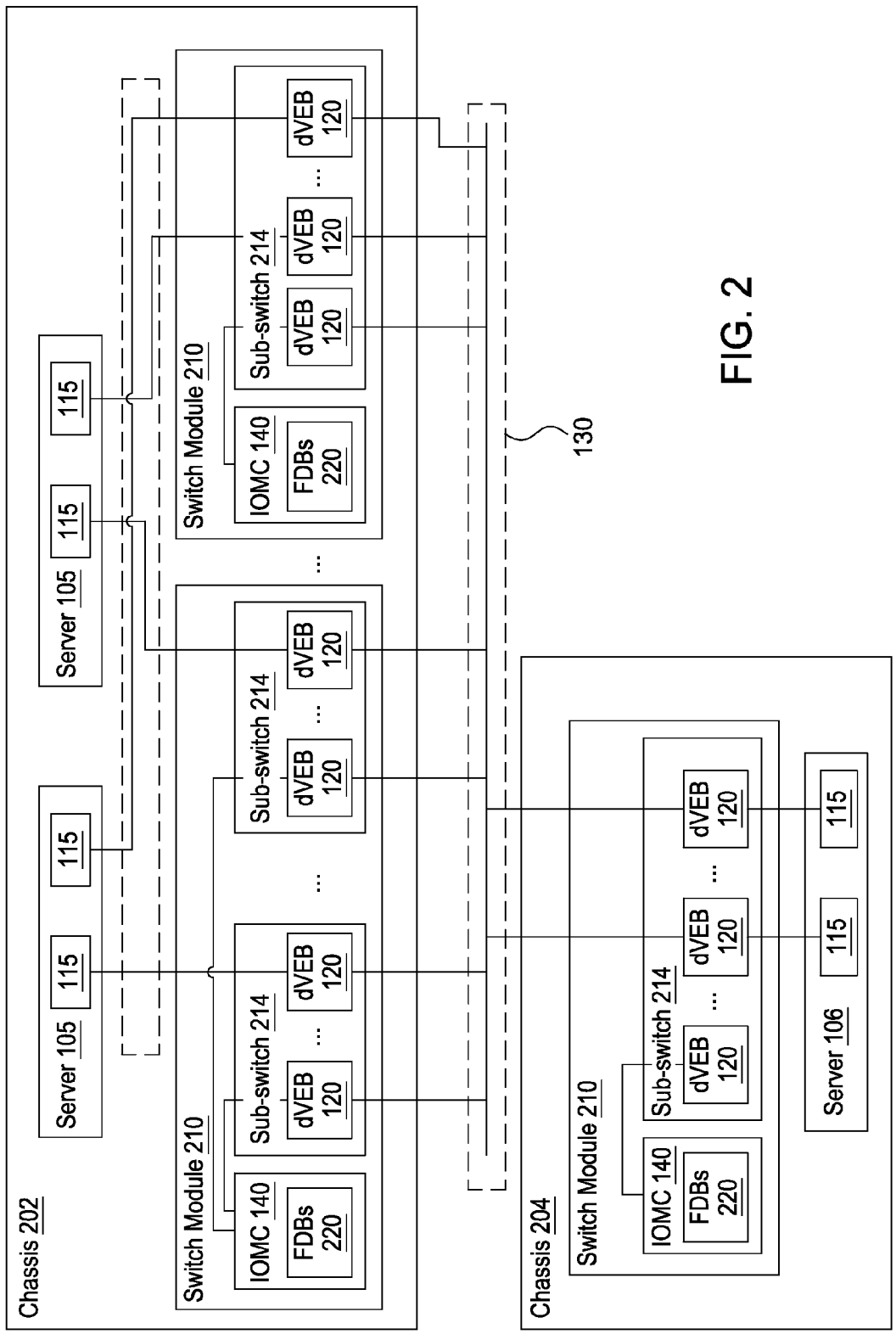
FIG. 2 illustrates a hardware representation of a system that implements a distributed network switch, according to one embodiment of the invention.

FIG. 2 illustrates the distributed network switch 180 having a plurality of bridge elements 120 connected to servers, according to one embodiment of the invention. As shown, a plurality of servers 105 may be physically located in the same chassis 202, and another server 106 may be physically located in a different chassis 204. It should be recognized that the chassis 202 and 204 may include any number of servers. As shown in FIG. 2, the plurality of bridge elements 120 are organized into a plurality of switch modules 210 and sub-switches 214 physically located and distributed across different chassis 202, 204. In one embodiment, the distributed network switch 180 disclosed herein is configured to provide Layer 2 Ethernet switching via multiple switch modules 210, the switching layer 130 interconnecting the switch modules 210, and management firmware executing on a management controller, such as IOMCs 140. Doing so may eliminate the need for stand-alone Ethernet switches to interconnect processing elements in the servers 105, 106. As such, a system networked using the distributed network switch 180 may also be augmented in a granular and scalable manner by adding individual components such as switch modules 210 or other processing elements.

In one embodiment, a switch module 210 (e.g., chassis interconnect elements) may be a physical switch unit configured to provide network bridging for the distributed network switch 180. In one embodiment, the switch modules 210 and sub-switches 214 are hardware components (e.g., PCB boards, FPGA boards, system on a chip, etc.) that provide physical support and connectivity between the network adapters 115 and the bridge elements 120. In general, the switch modules 210 include hardware that connects different chassis 202, 204 and servers 105 and 106 in the system illustrated. While switch modules 210 are configured as a Layer 2 Ethernet bridge for routing data frames (e.g., based on MAC address) in the embodiment described herein, it should be recognized that embodiments of the present disclosure may be applied to other forms of packet switching.

In one embodiment, the switch module 210 includes an IOMC 140 and one or more sub-switches 214. In one embodiment, an IOMC 140 for a given switch module 210 maintains a forwarding database (FDB) 220 shared by bridge elements 120 of a sub-switch 214. In some embodiments, the IOMC 140 may maintain a forwarding database 220 for each sub-switch 214 in the switch module 210. In one embodiment, the forwarding database 220 includes address data (e.g., MAC addresses) that is registered and maintained through communication and cooperation with the bridge elements 120, and in some cases, the servers 105 and 106. In some embodiments, the forwarding database 220 may be configured similarly to the forwarding database 150 shown in FIG. 1, where each switch module 210 is configured to maintain a synchronized copy of the forwarding database to give local bridge elements access to the entire forwarding database with low latency and rapid response times.

In one embodiment, the sub-switches 214 may include a logical or physical grouping of bridge elements 120. Each bridge element 120 may be a distributed Virtual Ethernet bridge (dVEB) configured to forward data frames throughout the distributed network switch 180 based on address data stored in the forwarding database 220. In one embodiment, the bridge elements 120 are managed by firmware executing on the IOMC 140. In the embodiment shown, at least one bridge element 120 in the sub-switch 214 may be connected to an IOMC 140 to give the IOMC access to the switching layer 130.

The bridge elements 120 are operatively connected to multiple bridge elements 120. In one embodiment, the bridge elements 120 are connected to each other using the switching layer 130 (e.g., via a mesh connection schema). As such, no matter the bridge element 120 used, a data packet can be routed to another bridge element 120 located on any other switch module 210. In some embodiments, this may be accomplished by directly connecting each bridge element 120, i.e., each bridge element 120 having a dedicated direct data path to every other bridge element 120. Alternatively, in some embodiments, the switching layer 130 may use a spine-leaf architecture wherein each bridge element 120 (i.e., a leaf node) is attached to at least one spine node. The spine nodes route data packets received from the bridge elements 120 to the correct spine node, which then forward the data packet to the correct bridge element 120. In one embodiment, the bridge elements 120 may forward data frames to other bridge elements 120 in the same sub-switch 214, in different sub-switches 214 of the same switch module 210, or even in different switch modules 210 via switching layer 130.

In the embodiment shown, each bridge element 120 has at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection. In one example, assuming a switch module 210 includes four sub-switches 214, each sub-switch 214 having five bridge elements 120, and each bridge element 120 having two ports connected to a server and to the switching layer 130, an entire switch module 210 may have at least 40 ports (e.g., 2×5×4=40) for receiving and forwarding data frames within the distributed network switch 180.

In operation, upon receiving an Ethernet frame at an ingress port, a bridge element 120 accesses the forwarding database 220 to determine if the source or destination address (e.g., MAC addresses) are present in the forwarding database. For example, each bridge element 120 generates a destination address lookup and a source address lookup per frame to the forwarding database. Each bridge element 120 then uses the routing information received from the lookups to send the frame to the appropriate interface (e.g., destination port). For unsuccessful lookups, the bridge element 120 may learn new network addresses and insert new routing entries into the forwarding database 220. As used herein, learning a network address of a frame by a switch module may refer to obtaining routing information for the network address from both configuration fields in the switch module and the physical port and logical port that the frame was received on. For example, the bridge element may learn the interface on which the bridge element first saw a particular source address, and associate that interface with that source address. When the bridge element 120 subsequently receives a frame with a destination address in its forwarding database, the bridge element may send the frame out the interface stored in the forwarding database.

In one embodiment, the switch modules 210 are configured to exchange routing information and share new routing entries. The switch modules 210 synchronize content of the respective forwarding databases 220 such that all forwarding databases 220 contain similar routing information. As such, a forwarding database 220 and its routing information are effectively common to all the switch modules 210 and bridge elements 120 contained therein, though each switch module 210 may manage at least one local copy of a forwarding database 220.

LOGICAL SWITCH PARTITIONS

In one embodiment, a switch module 210 is a physical unit that may be logically partitioned into a plurality of logical switch partitions. Each logical switch partition, interchangeably referred to as a logical network (LN), may have a respective LN identifier and may include a respective, logically specified network portion of the distributed network switch. The logical networks behave as independent Layer 2 domains even though the domains may co-exist on the same physical switch module 210, and provide a layer of traffic separation. In one example, switch modules 210 may support up to four different logical switch partitions. In one embodiment, a logical switch partition may span several switch modules 210, even across switch modules that are in different chassis 202 and 204 that are interconnected by the switching layer 130. The logical switch partitions enable the hardware resources of the switch modules 210 to be flexibly allocated between logical networks.

As described above, the switch modules 210 in effect use a common forwarding database 220, and as such, the forwarding database 220 may include routing entries for ports in all of the logical switch partitions. In some cases, end stations (e.g., servers 105) assigned to a given logical network (e.g., logical switch partition) may have a large number of MAC addresses or high volume of traffic through the distributed network switch 180. As a result, routing entries for the logical network may dominate or fill up the available space in forwarding database 220, leaving little room for entries for the other networks and forcing end stations on other logical networks to flood the network. Accordingly, embodiments of the present disclosure provide a method for controlling utilization of the forwarding databases on a per logical network basis.

In some embodiments, the forwarding database 220 may be implemented using content addressable memory (CAM) or ternary content addressable memory (TCAM) that provide a fast lookup for routing information. In such embodiments, the TCAM may be partitioned into separate spaces corresponding to each logical switch partition. Each partitioned space in the TCAM may be configured to store a predetermined number of routing entries, thereby limiting the number of routing entries that a given logical network may store in the forwarding database 220.

In other embodiments, the forwarding database 220 may be implemented using a plurality of hash-based forwarding tables and a set of hash functions. While a hash-based implementation allows for a large number of routing entries (e.g., 512,000 entries), there are challenges to controlling utilization of the forwarding database on a per logical network basis. For example, hash-based forwarding database may not be partitioned into separate physical spaces (as with a TCAM-based forwarding database), because entries for a given logical network may be greatly dispersed or distributed due to the use of hash functions. As such, embodiments of the present disclosure provide a method for using counters and threshold values to control utilization of the forwarding database on a per logical network basis. One example hash-based forwarding database 220 is shown in greater detail in FIG. 3.

Figure 3:
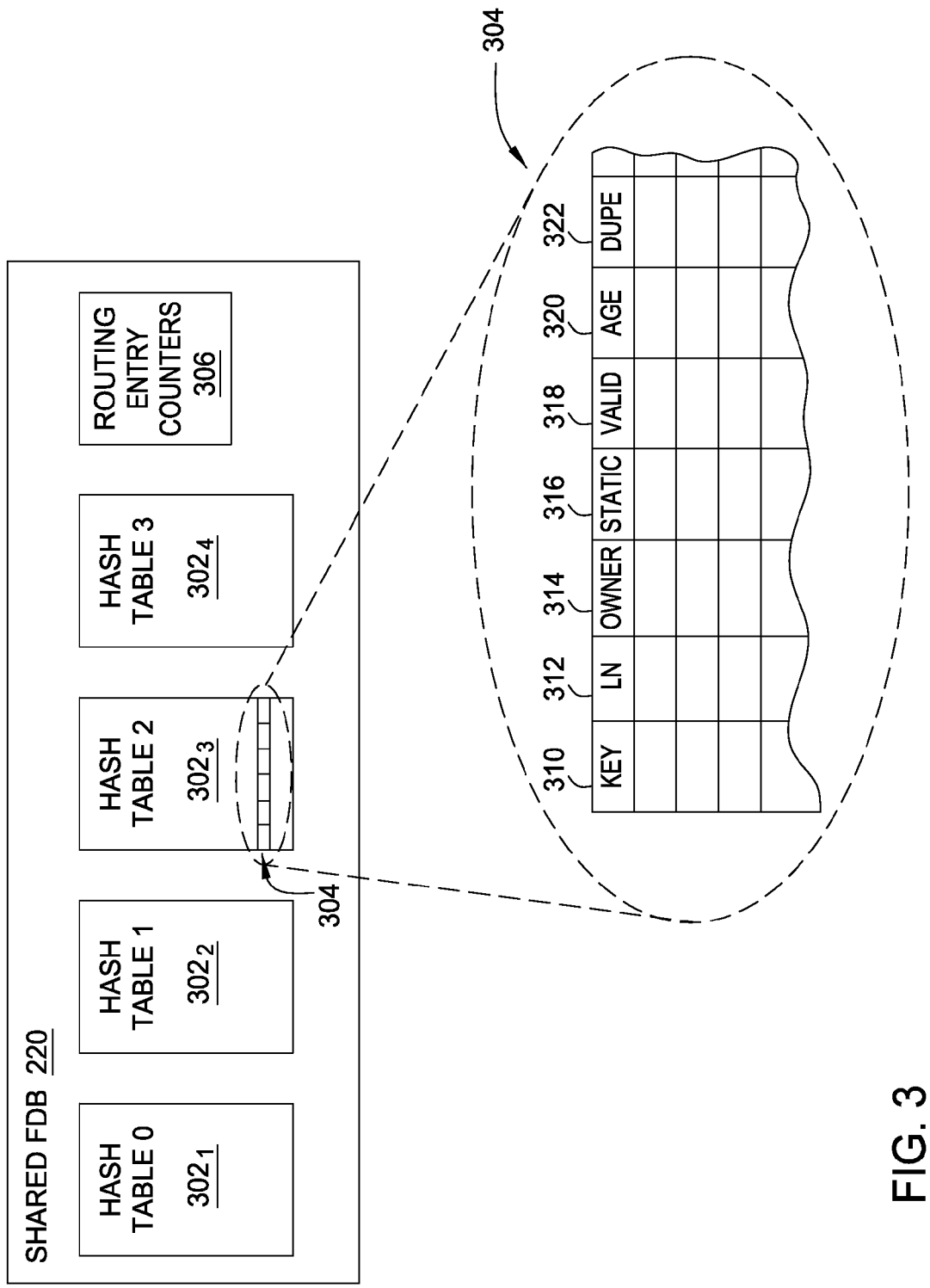
FIG. 3 is a block diagram depicting a forwarding database of a switch module, according to one embodiment of the invention.

FIG. 3 is a block diagram depicting a forwarding database 220 of a switch module, according to one embodiment of the invention. In one embodiment, the forwarding database 220 may include one or more hash tables $302_{1-4}$ configured to store a plurality of routing entries 304 (sometimes referred to as FDB entries) and a plurality of routing entry counters 306. The routing entry counters 306 track the use of the forwarding database 220 by maintaining, for each logical network, a separate count of the number of routing entries 304 for that logical network that is stored within the entire forwarding database 220. In one embodiment, when the routing entry counters 306 exceed certain threshold values, remedial actions may be performed, including selecting and removing certain routing entries 304 associated with a given logical network, or pausing the learning of new network addresses associated with a given logical network, as described in greater detail later.

In one embodiment, each hash table $302_{1-4}$ may be associated with a hash function selected, for example, to reduce frequency of collisions of routing entries. In some embodiments, a routing entry 304 is inserted, updated, and retrieved into a given hash table 302 by using the hash function associated with the given hash table to generate a hash value based on a routing key 310 of the routing entry. In one embodiment, a routing entry counter 306 for a given logical network may be incremented when a routing entry for that logical network is inserted into one of the hash tables $302_{1-4}$, and decremented when a routing entry for that logical network is invalidated and removed from the forwarding database 220.

In one embodiment, the routing key 310 includes Layer 2 routing information, such as a virtual local area network (VLAN) tag, a logical network (LN) identifier, and a media access control (MAC) address. In one embodiment, MAC addresses may be generated and assigned by the IOMCs 140, for example, as set by an administrator or computing system. The VLAN tag may indicate an assigned VLAN, which may be used to segregate traffic and to allow more than one uplink. There may be multiple VLANs on a single uplink. In some embodiments, each VLAN uses only one uplink port. In other words, only one physical uplink port may be used at a given time to forward a data frame associated with a given VLAN. In other embodiments, through the use of logical networks, a VLAN may use multiple physical ports to forward traffic while also maintaining traffic separation. In one embodiment, each logical network may have a respective logical network identifier and may provide an additional layer of traffic separation. When so configured, logical networks may allow different clients to use the same VLAN tag, and the VLANs of each client may remain segregated by virtue of the different logical networks.

In one embodiment, routing entries 304 associate a network address (e.g., destination MAC address) with a network interface (e.g., port) to which a data frame is to be forwarded. In one embodiment, as shown in the enlarged view of FIG. 3, each routing entry 304 identified by a routing key 310 may include a plurality of fields, including a logical network field 312, an owner field 314, a static field 316, a valid status field 318, an age field 320, and a duplicate field 322.

In one embodiment, the logical network field 312 enables each routing entry 304 for a given network address (e.g., source, destination) to specify a logical network (LN) identifier associated with the given network address. In some embodiment, the logical network field 312 may include a numeric identifier (e.g., "1", "3") for the corresponding logical network. For example, assuming a switch module 210 partitioned into four logical networks labeled LN0-3, where the first logical network LN0 is mapped to network address 192.168.0.1 to 192.168.0.10, a routing entry for the network address 192.168.0.3 may specify the logical network "0".

In one embodiment, each routing entry 304 has a corresponding switch module that is designated as the "owner" of the respective routing entry. As used herein, the owner of a routing entry having a given network address refers to the switch module (and corresponding forwarding database) that is configured to learn the given network address, and insert a new routing entry for the given network address into the forwarding database 220. In one embodiment, the owner of a routing entry having a given routing key 310 is the switch module having a bridge element 120 with a physical port matching the combination of VLAN, LN, and MAC address of the routing key 310. In one embodiment, the owner of a routing entry is responsible for notifying other switch modules and synchronizing a corresponding routing entry in the forwarding databases of the other switch modules. In one implementation, the owner of a routing entry is represented by setting a bit field (e.g., owner field 314) to one (or non-zero) in the forwarding database 220 of the owning switch module. Meanwhile, a synchronized copy of the routing entry in other forwarding databases may set the bit field in the owner field 314 to zero to specify the corresponding switch module is not the owner.

In one embodiment, one or more of the routing entries 304 may be static routing entries. As used herein, static routing entries refer to routing entries that are set by software and are not synchronized or shared with other switch modules and forwarding databases. In one embodiment, a static routing entry may be designated by setting a static bit (e.g., static field 316) in the routing entry to one or non-zero, while a non-static routing entry (referred to as dynamic entries) may be designated by setting the static field 316 to zero.

A switch module 210 may implement an aging policy to maintain its forwarding database 220. In one embodiment, each routing entry 304 may include an age attribute that specifies an extent to which the respective routing entry is considered to have aged or to be stale. In some embodiments, the age attributed is represented by an age bit (e.g., age field 320) in the routing entry. In one embodiment, during operation, an age bit of a routing entry may be set to one when a background timer expires. If the background timer expires once again, the routing entry having the age bit set to one will be invalidated (e.g., as specified by the valid status field 318). A routing entry may be set or reset to zero when routing entry is initially inserted into the forwarding database or when the routing entry is retrieved from the forwarding database during a lookup (e.g., a source address lookup hit occurring from the receiving path of a bridge element 120). In one embodiment, when a routing entry is "aged" out and removed from the forwarding database, a routing entry counter 306 for the logical network associated with the removed routing entry may be decremented.

In one embodiment, each routing entry 304 may include the valid status field 318 that specifies when a routing entry is no longer valid, for example, due to aging out of the forwarding database, as described above. In one embodiment, each routing entry may be set as invalid in order to limit the number of routing entries in the forwarding database 220 for a given logical network. In some embodiments, the valid status of a routing entry may be expressed by setting a bit field (e.g., valid status field 318) to one or zero. In some embodiments, the switch module 210 may be configured to send indications to other switch modules that specify forwarding databases should be synchronized by invalidating the designated routing entry.

In one embodiment, the forwarding database 220 may be configured to replicate one or more routing entries 304 in one hash table to the other hash tables 302 to increase access bandwidth and improve performance. For example, the forwarding database may take a routing entry repeatedly retrieved from one portion of a hash table $302_1$, sometimes referred to as "slices," and replicate the routing entry to a less-often used slice in another hash table 302. As such, each routing entry may include a duplicate field 322 indicating whether the routing entry 304 is a replicated or the original routing entry within the shared forwarding database 220. In some embodiments, both the original routing entry and duplicate entries may age (e.g., as indicated by the age field 320) and be invalidated (e.g., via the valid status field 318). In some embodiments, a forwarding database may not send indications to synchronize replicated routing entries with other forwarding databases.

Each forwarding database 220 maintains a plurality of routing entry counters 306 for tracking how the plurality of logical switch partitions (e.g., logical networks) use the shared forwarding database. In one embodiment, the routing entry counters 306 includes a count, for each given logical network, of the numbers of routing entries 304 in the forwarding database 220 that are associated with a given logical network, herein referred to as FDB counts. For example, where a forwarding database 220 includes routing entries that may come from four logical networks 0-3, four separate FDB counts (for LN0, LN1, LN2, and LN3) are maintained. In embodiments of the switch module configured to replicate routing entries, the routing entry counters 306 may include a total FDB count for each logical network, including dynamic and static routing entries (e.g., as indicated by the static field 316), but excluding duplicate routing entries (e.g., as indicated by the duplicate field 322).

In one embodiment, the routing entry counters 306 further include a "high watermark" count that maintains a highest historical value reached by a corresponding FDB count. In some embodiments, separate high watermark counts may be configured for dynamic routing entries, for static routing entries, and for total entries including both dynamic and static routing entries. For switch modules configured to replicate routing entries, the high watermark counts for dynamic routing entries, static entries, and total dynamic and static routing entries may exclude duplicate routing entries as specified by the duplicate field 322. In some embodiments, switch modules configured to replicate routing entries may include a high watermark count for duplicate routing entries. In some embodiments, the high watermark counts may be accessible (e.g., via an architected register having read and write access) to higher level processes (e.g., software) to allow the high watermark counts to be reset to zero to determine new high watermark values.

Figure 4:
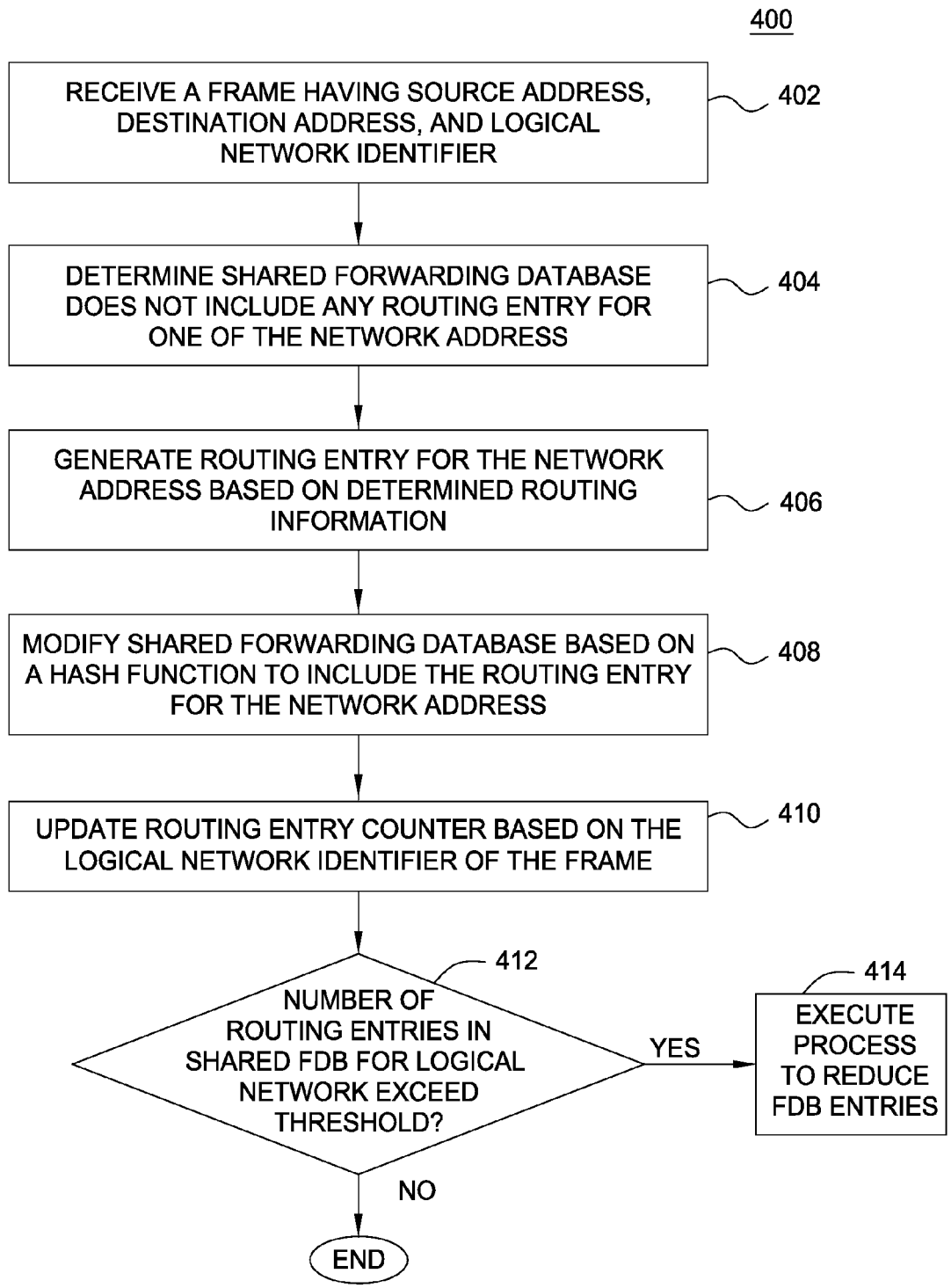
FIG. 4 is a flowchart depicting a method for logically partitioning a hash-based routing table in the distributed network switch, according to one embodiment of the invention.

FIG. 4 is a flowchart depicting a method for logically partitioning a hash-based routing table in the distributed network switch, according to one embodiment of the invention. As shown, the method 400 begins at step 402, where a first switch module of the distributed network switch receives a first data frame having a source address, a destination address, and a logical network identifier. In some embodiments, one of the bridge elements 120 (e.g., dVEB0) of the first switch module receives a data frame at one of its ingress ports, for example, connected to a server 105. In some embodiments, the source and destination addresses are MAC addresses assigned to interfaces of servers (e.g., servers 105, 106).

At step 404, the first switch module determines that the shared forwarding database (e.g., forwarding database 220) does not include any routing entry for one of the network addresses. For example, the bridge element dVEB0 performs a lookup of the shared forwarding database using the source MAC address, VLAN tag, and LN identifier of the received data frame, and the lookup operation returns a "miss" indicating a routing entry for the source MAC address is not included within the shared forwarding database. For sake of illustration, it may be assumed in this example that the bridge element dVEB0 performs a destination address lookup in the forwarding database that returns the routing information for the destination address. The bridge element may process and forward the data frame using the returned routing information, for example, by handing the frame to the switching layer 130 for delivery. The bridge element dVEB0 proceeds to handle the missing routing entry for the source MAC address.

At step 406, the first switch module generates a routing entry for the network address based on determined routing information. In one embodiment, the first switch module generates a routing entry that includes both the source address and the routing information determined for the source address and the logical network identifier. In some embodiments, the generating routing entry includes a routing key (e.g., routing key 310) based on the VLAN tag, LN identifier, and source MAC address of the data frame. In some embodiments, the first switch module may configure the generated routing entry to specify (e.g., by setting the logical network field 312) that the routing entry is associated with a given logical network. In some embodiments, the routing entry for the source address is associated with the logical network identified provided by the received data frame. In one embodiment, the first switch module may configure the generated routing entry to specify (e.g., by setting the owner field 314) that owner for the routing entry is the first switch module based on satisfaction of the following conditions: the first switch module received the first data frame, determined the source address is not included in the forwarding database, and generated the given routing entry.

At step 408, the first switch module modifies, or requests to modify, the shared forwarding database 220 based on a hash function to include the routing entry for the network address. For example, the bridge element dVEB0 of the first switch module inserts the routing entry into the forwarding database using a routing key based on routing information, such as a VLAN tag, a logical network identifier, and MAC address.

At step 410, the first switch module updates a routing entry counter (e.g., routing entry counter 306) based on the logical network identifier of the included routing entry. For example, the first switch module increments the routing entry counter for a given logical network when a routing entry for that logical network is inserted into the forwarding database 220. In one embodiment, a routing entry counter for a given logical network may track the number of entries, including both static and dynamic routing entries, that a given logical network has in the forwarding database. In one embodiment, the first switch module may update high watermark counts corresponding to the updated routing entry counter. In some embodiments, the first switch module may determine whether the updated routing entry counter exceeds the current value of the high watermark count, and then update the high watermark count to specify a new highest value that the corresponding routing entry counter has reached.

In one embodiment, the first switch module may enforce limits for routing entries for the logical network in the shared forwarding database. At step 412, the first switch module determines whether the number of entries in the shared forwarding database for a given logical network exceeds a threshold value associated with the given logical network. In one embodiment, the first switch module retrieves the routing entry count (e.g., routing entry counter 306) for a first logical network (e.g., LN 0) and determines whether the routing entry counter for the first logical network is greater than the threshold value. In one embodiment, the threshold value, referred herein to as a "reduce threshold," specifies a maximum amount of routing entries that a particular logical network may have in the shared forwarding database before the switch module initiates a remedial action, such as selectively reducing routing entries associated with the corresponding logical network from the forwarding database, as described later in conjunction with FIG. 5. The reduce threshold associated with a given logical network may be programmable, for example, set in a configuration register. In some embodiments, the first switch module includes separate reduce thresholds for each logical network, each reduce threshold being associated with a corresponding logical network. In one embodiment, the reduce thresholds may be dynamically determined for each logical network based on usage of the shared forwarding database by the different logical switch partitions. For example, values of the high watermark values and FDB counts for the logical networks may be analyzed to determine new threshold values that better fit a particular use case or network configuration.

In some embodiments, the first switch module may be configured to enable or disable, using a configurable bit switch, detecting an FDB count for a corresponding logical network in excess of the reduce threshold. For example, a switch module supporting up to four logical switch partitions may include four enable switches bits for limiting the FDB count for the four logical switch partitions up to the reduce threshold value. As such, by enabling the FDB count limitation for some logical networks and not others, a switch module may be configured to permit a particular logical switch partition to insert many routing entries in the forwarding database while limiting the number of routing entries from other logical switch partitions. In operation, the first switch module is configured to determine whether the FDB count limitation is enabled based on the corresponding configurable bit for a given logical network prior to proceeding with a "reduce forwarding database" function, as described below.

At step 414, if the routing entry count for any of the logical networks exceeds the corresponding reduce threshold, the first switch module executes a process to reduce the number of routing entries for that logical network. In one embodiment, the first switch module executes a background process that walks through the shared forwarding database to selectively remove routing entries in the forwarding database for the corresponding logical network, as described below in conjunction with FIG. 5.

While embodiments of the invention are described herein inserting new routing entries based on source address learning from an ingress frame, certain aspects of the present disclosure may be applied to the insertion of new routing entries in the shared forwarding database from a number of sources. For example, a first switch module may insert new routing entries for a MAC address learned from a frame flooded on a broadcast domain. In another example, a higher-level process (e.g., software) may directly insert new routing entries, referred to herein as static routing entries, for a network address into the shared forwarding database. In another example, a first switch module may modify the shared forwarding database to insert new routing entries based on synchronization messages transmitted by other switch modules that request the first switch module update its forwarding database. The first switch module may insert a routing entry into the forwarding database that was learned by the other switch modules, and increment the corresponding routing entry counter.

Figure 5:
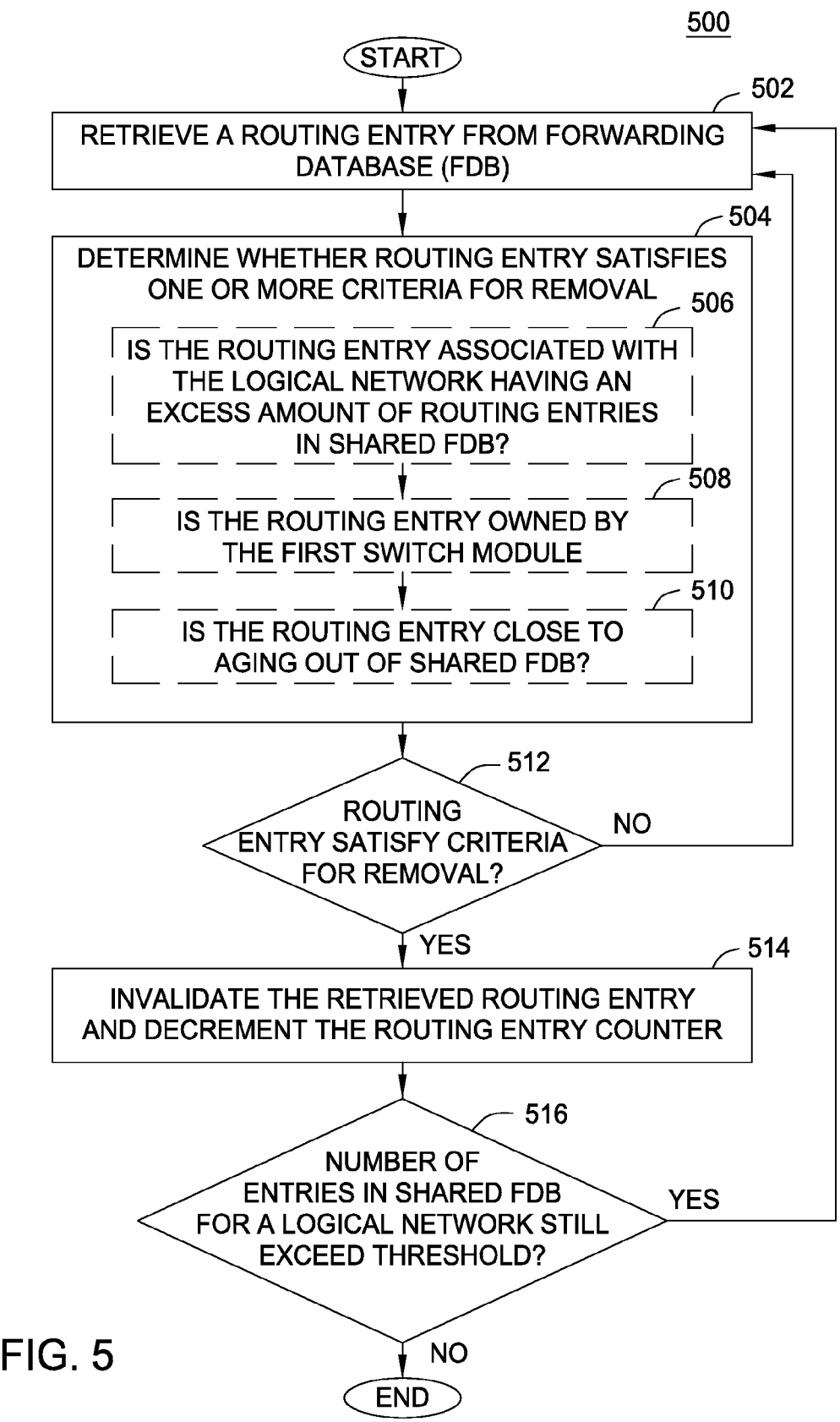
FIG. 5 is a flowchart depicting a method for reducing routing entries for a particular logical switch partition in the routing table shared by different logical switch partitions, according to one embodiment of the invention.

FIG. 5 is a flowchart depicting a method for reducing routing entries for a logical switch partition in the forwarding database shared by different logical switch partitions, according to one embodiment of the invention. In one embodiment, the method 500 may be performed by a background process operating concurrently with the forwarding and learning operations of the first switch module described above. As shown, the method 500 begins at step 502, where the first switch module retrieves a first routing entry from the shared forwarding database. In some embodiments, the first switch module may retrieve sequential routing entries from the hash tables of the shared forwarding database. At step 504, the first switch module determines whether the retrieved routing entry may be selected for removal based on one or more criteria for properties of the routing entry, including at least one of the routing entry's logical network, age, valid status, static status, duplicate status, and owner.

In some embodiments, as shown in step 506, the first switch module is configured to select the routing entry for removal if the routing entry is a valid routing entry associated with a logical network that matches the first logical network having the excessive routing entry count. For example, the first switch module may select for removal a routing entry having a logical network field 312 value that matches the logical network identifier of the first logical network and having a valid status field 318 set to one.

In some embodiments, at step 508, the first switch module may further check whether the routing entry is owned by the first switch module, for example, as specified by the owner field 314. That is, each switch module 210 may be configured to selectively remove, from its corresponding forwarding database 220, routing entries 304 of which it is the owner.

In some embodiments, at step 510, a routing entry may further be selected for removal based on an age attribute (e.g., age field 320) that indicates the respective routing entry has or become stale. In some embodiments, a routing entry may further be selected for removal based on whether the respective routing entry is a duplicate or replicated routing entry (e.g., duplicate field 322=0). In some embodiments, a routing entry may further be selected for removal based on whether the respective routing entry is not a static routing entry (e.g., static field 316=0).

At step 512, if the retrieved routing entry does not satisfy the one or more criteria for removal, then the first switch module returns operations back to step 502 to retrieve another routing entry from the forwarding database 220 for possible reduction. If the retrieved routing entry satisfies the specified criteria for removal, at step 514, the first switch module invalidates the respective routing entry and decrements the routing entry counter based on the logical network identifier found in the routing entry. In one embodiment, the first switch module marks the respective routing entry for removal by resetting the valid status field 318. The first switch module may update the FDB count (e.g., routing entry counters 306) by decrementing the invalidated routing entry from the FDB count. In some embodiments, the first switch module may be configured to transmit a synchronize-invalidate indication to other switch modules to invalidate the selected routing entry in the respective forwarding databases, without regard to the aging policies or FDB count thresholds of the other switch modules. Doing so may quickly reduce the FDB count for a given logical network across multiple switch modules. In other embodiments, the switch modules may be configured to allow excess routing entries for a given logical network to be invalidated independently by each switch module.

At step 516, the first switch module may re-check whether the FDB count for the logical network having an excessive number of entries continues to exceed the reduce threshold. If so, the first switch module returns to step 502 and retrieves another routing entry from the forwarding database for possible reduction. If not, the background reduce process may terminate, having decreased the FDB count for a corresponding logical network below the reduce threshold value.

In some cases, the reduce process shown in FIG. 5 may be unable to remove routing entries from the shared forwarding database fast enough to lower the routing entry count below an acceptable level. In such cases, embodiments of the present invention provide a mechanism for using a second threshold with a corresponding remedial action, as shown in FIG. 6.

Figure 6:
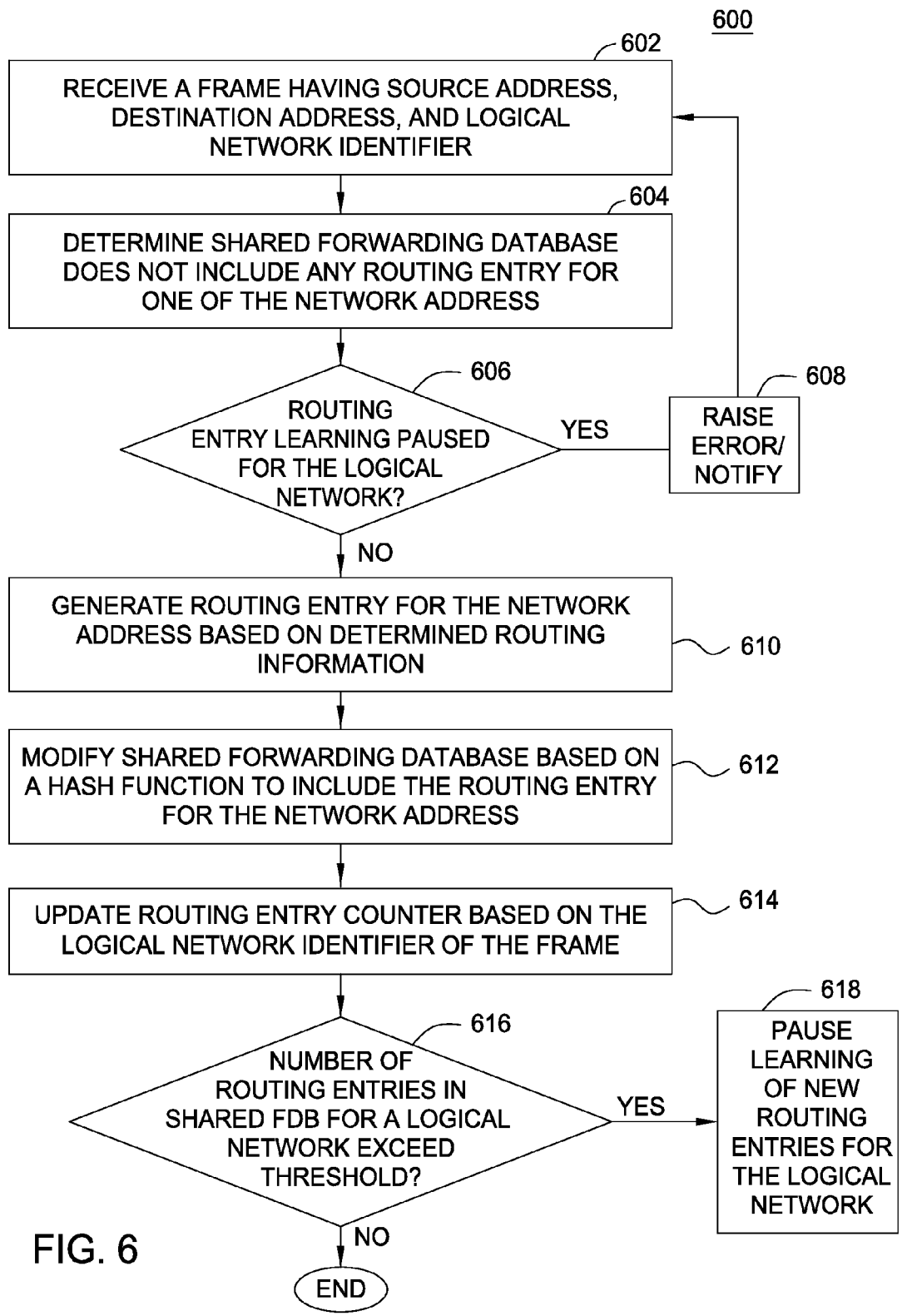
FIG. 6 is a flowchart depicting a method for maintaining the routing table shared by different logical switch partitions, according to one embodiment of the invention.

FIG. 6 is a flowchart depicting a method 600 for maintaining the forwarding database shared by different logical switch partitions, according to one embodiment of the invention. As shown, the method 600 begins at step 602, where the first switch module of the distributed network switch receives a first data frame having a source address, destination address, and logical network identifier. At step 604, the first switch module determines that the shared forwarding database (e.g., forwarding database 220) does not include any routing entry for one of the network addresses.

At step 606, the first switch module determines whether learning of new network addresses has been paused for the logical network associated with the ingress frame. As described later, in some embodiments, the first switch module may determine whether a "stop learning" logical state has been entered into. If so, the first switch module declines to learn new network addresses for the logical network and not insert a new routing entry in the forwarding database. If not, the first switch module may proceed to step 610 below. At step 608, the first switch module may communicate that a routing entry for the given logical network has not been inserted into the forwarding database due to the "stop learning" logical state by raising an error or transmitting a notification. In some embodiments, the first switch module may set a notification field associated with a given logical network for notifying other elements (e.g., software) when a routing entry for the given logical network is not inserted due to the "stop learning" logical state. In some embodiments, the first switch module may have a separate notification field for each corresponding logical network (e.g., LN 0-3). As shown, the first switch module may then return to step 602 to await receipt of additional data frames on ingress ports.

At step 610, the first switch module generates a routing entry for the network address based on determined routing information. In one embodiment, the first switch module generates a routing entry that includes both the source address and the routing information determined for the source address and the logical network identifier. At step 612, the first switch module modifies, or requests to modify, the shared forwarding database 220 based on a hash function to include the routing entry for the network address. For example, the bridge element dVEB0 of the first switch module inserts the routing entry into the forwarding database using a routing key based on routing information, such as a VLAN tag, a logical network identifier, and MAC address. At step 614, the first switch module updates a routing entry counter (e.g., routing entry counter 306) based on the logical network identifier of the inserted routing entry.

At step 616, the first switch module determines whether the number of entries in the shared forwarding database for a given logical network exceeds a second threshold value associated with the given logical network. This second threshold value, referred to herein as a "stop learning threshold," specifies a maximum amount of routing entries that a particular logical network may have in the shared forwarding database before the switch module initiates a remedial action of ceasing insertion of new routing entries for the corresponding logical network. In one embodiment, the first switch module retrieves the routing entry count (e.g., routing entry counter 306) for a first logical network (e.g., LN 0) and determines whether the routing entry counter for the first logical network is greater than the stop learning threshold. The stop learning threshold associated with a given logical network may be programmable, for example, set in a configuration register. In some embodiments, the first switch module includes separate stop learning thresholds for each logical network, each stop learning threshold being associated with a corresponding logical network. In one embodiment, the threshold values may be dynamically determined for each logical network based on usage of the shared forwarding database by the different logical switch partitions. For example, values of the high watermark values and FDB counts for the logical networks may be analyzed to determine new stop learning thresholds that better fit a particular use case or network configuration.

If the routing entry count does exceed the stop learning threshold for a given logical network, at step 618, the first switch module pauses learning of new network addresses for the first logical network. In one embodiment, the first switch module may enter a "stop learning" logical state that specifies the forwarding database should stop inserting new routing entries for the first logical network. A forwarding database 220 under a "stop learning" logical state is configured to pause learning of new network addresses based on data frames received on local ingress ports by bridge elements of the first switch module (e.g., source address learning). In some embodiments, the forwarding database 220 is further configured to pause learning of new network addresses from other forwarding databases via synchronization operations. In one embodiment, a forwarding database 220 under a "stop learning" logical state may even prevent insertion by higher level processes (e.g., software) of static routing entries. Alternatively, the first switch module may be configured to continue to accept static routing entries for insertion into the forwarding database despite a "stop learning" logical state.

In one embodiment, the first switch module may be configured to enable or disable the "stop learning" logical state for a corresponding logical network using a configurable bit switch. For example, a switch module supporting up to four logical switch partitions may include four enable bits for the "stop learning" logical state. In operation, the first switch module is configured to determine whether the "stop learning" logical state is enabled based on the corresponding configurable bit for a given logical network prior to pausing the learning of new network addresses for the given logical network.

In one embodiment, the stop learning threshold may be used in conjunction with the reduce threshold. For example, the reduce threshold may set to a value less than the value of the stop learning threshold to implement a policy that attempts to reduce the number of entries for a logical network via a background process (e.g., as shown in FIG. 5), and only executes the stop learning procedure if the reduce process cannot reduce routing entries fast enough.

Embodiments of the invention provide techniques for managing a forwarding database for a distributed network switch. In one embodiment, the distributed network switch may be logically partitioned into a plurality of logical networks, or logical switch partitions. In one embodiment, a switch module of the distributed network switch implements counters that tracks the number of routing entries per logical network inserted into the hash tables of the forwarding database. When the switch module detects a counter for a given logical network has exceeded a threshold value, the switch module may take a number of remedial actions, such as selectively removing routing entries for the corresponding logical network from the forwarding database, or pause insertion of new routing entries for the corresponding logical network into the forwarding database. Accordingly, the distributed network switch may efficiently manage use of the forwarding database shared by different logical networks, while continuing to enjoy benefits of a hash table based implementation of the forwarding database. As such, the distributed network switch may operate more efficiently at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method for routing table management in a distributed network switch having a plurality of switch modules, wherein each switch module comprises: a plurality of bridge elements and a routing table, wherein the routing table in each switch module is shared among the plurality of bridge elements in the respective switch module, wherein the plurality of switch modules are logically partitioned into a plurality of logical networks, the method comprising:

receiving, by a first switch module, a first frame having a source address and a destination address, wherein the first frame is associated with a first logical network of the plurality of logical networks;

upon determining that the routing table of the first switch module does not include a routing entry for the source address, modifying the routing table in the first switch module to include a first routing entry having routing information determined for the source address and the first logical network;

updating a count of routing entries in the routing table that are associated with the first logical network; and upon determining that the count of routing entries associated with the first logical network exceeds a first threshold value associated with the first logical network, modifying the routing table to invalidate a second routing entry in the routing table based on the second routing entry being associated with the first logical network,
wherein the modifying comprises: determining that the second routing entry is a non-static routing entry; determining that the second routing entry is not replicated from other portions of the routing table; and determining that the first switch module is an owner of the second routing entry, wherein the owner of a routing entry for a network address is characterized as a switch module having a forwarding database that learned the network address.

2. The computer-implemented method of claim 1, wherein the modifying the routing table to invalidate the second routing entry is based on an extent to which the second routing entry is considered to have aged according to a predetermined aging policy of the routing table.

3. The computer-implemented method of claim 1, further comprising: decrementing the count of routing entries in the routing table that are associated with the first logical network based on the number of routing entries associated with the first logical network that have been invalidated in the routing table.

4. The computer-implemented method of claim 1, further comprising: upon determining that the updated count of routing entries associated with the first logical network is greater than a highest historical value for the count, updating the highest historical value to be equal to the corresponding updated count.

5. The computer-implemented method of claim 1, further comprising: upon determining that the count of routing entries associated with the first logical network exceeds a second threshold value associated with the first logical network, the second threshold value being greater than the first threshold value, modifying the routing table to pause insertion of new routing entries associated with the first logical network.

6. The computer-implemented method of claim 5, further comprising: receiving, by the first switch module, a second frame having a source address and a destination address, wherein the second frame is associated with the first logical network; upon determining that the routing table of the first switch module does not include a routing entry for the source address of the second frame, and upon further determining that the routing table has been modified to pause insertion of new routing entries associated with the first logical network, generating a notification that indicates a new routing entry has not been inserted into the routing table for exceeding the second threshold value associated with the first logical network.

7. The computer-implemented method of claim 1,
wherein the modifying the routing table in the first switch module to include the first routing entry further comprises:
modifying the routing table in the first switch module based on a hash function to include the first routing entry, wherein the first routing entry stores a routing key based on a virtual local area network (VLAN) tag, a logical network (LN) identifier, and a media access control (MAC) address.

8. A computer-implemented method for routing table management in a distributed network switch having a plurality of switch modules, wherein each switch module comprises a plurality of bridge elements and a routing table, wherein the routing table in each switch module is shared among the plurality of bridge elements in the respective switch module, wherein the plurality of switch modules are logically partitioned into a plurality of logical networks, the method comprising:
receiving, by a first switch module, a first frame having a source address and a destination address, wherein the first frame is associated with a first logical network of the plurality of logical networks;
upon determining that the routing table of the first switch module does not include a routing entry for the source address, modifying the routing table in the first switch module to include a first routing entry having routing information determined for the source address and the first logical network;
updating a count of routing entries in the routing table that are associated with the first logical network;
upon determining that the count of routing entries associated with the first logical network exceeds a first threshold value associated with the first logical network, modifying the routing table to invalidate a second routing entry in the routing table based on the second routing entry being associated with the first logical network;
upon determining that the count of routing entries associated with the first logical network exceeds a second threshold value associated with the first logical network, the second threshold value being greater than the first threshold value, modifying the routing table to pause insertion of new routing entries associated with the first logical network;
receiving, by the first switch module, a second frame having a source address and a destination address, wherein the second frame is associated with the first logical network; and
upon determining that the routing table of the first switch module does not include a routing entry for the source address of the second frame, and upon further determining that the routing table has been modified to pause insertion of new routing entries associated with the first logical network, generating a notification that indicates a new routing entry has not been inserted into the routing table for exceeding the second threshold value associated with the first logical network.

9. The computer-implemented method of claim 8, wherein the modifying the routing table to invalidate the second routing entry is based on an extent to which the second routing entry is considered to have aged according to a pre-determined aging policy of the routing table.

10. The computer-implemented method of claim 8, wherein the modifying the routing table to invalidate the second routing entry further comprises: determining that the second routing entry is a non-static routing entry;
determining that the second routing entry is not replicated from other portions of the routing table; and
determining that the first switch module is an owner of the second routing entry, wherein the owner of a routing entry for a network address is characterized as a switch module having a forwarding database that learned from the network address.

11. The computer-implemented method of claim 8, further comprising: decrementing the count of routing entries in the routing table that are associated with the first logical network based on the number of routing entries associated with the first logical network that have been invalidated in the routing table.

12. The computer-implemented method of claim 8, further comprising: upon determining that the updated count of routing entries associated with the first logical network is greater than a highest historical value for the count, updating the highest historical value to be equal to the corresponding updated count.

13. The computer-implemented method of claim 8, wherein the modifying the routing table in the first switch module to include the first routing entry further comprises: modifying the routing table in the first switch module based on a hash function to include the first routing entry, wherein the first routing entry stores a routing key based on a virtual local area network (VLAN) tag, a logical network (LN) identifier, and a media access control (MAC) address.

* * * * *